(No Model.)

J. BADERTSCHER.
SCYTHE.

No. 504,773. Patented Sept. 12, 1893.

Witnesses
Albert Jones
John F. Gairns.

Inventor
Johann Badertscher
By his Attorneys
Wheatley & Mackenzie

UNITED STATES PATENT OFFICE.

JOHANN BADERTSCHER, OF LANGNAU, SWITZERLAND.

SCYTHE.

SPECIFICATION forming part of Letters Patent No. 504,773, dated September 12, 1893.

Application filed January 18, 1893. Serial No. 458,835. (No model.) Patented in Switzerland June 30, 1892, No. 5,259, and in France July 4, 1892, No. 222,796.

*To all whom it may concern:*

Be it known that I, JOHANN BADERTSCHER, a citizen of the Republic of Switzerland, and a resident of Langnau, canton of Berne, in the Republic of Switzerland, have invented certain new and useful Improvements in Scythes, (for which I have obtained patents in Switzerland, No. 5,259, dated June 30, 1892, and in France, No. 222,796, dated July 4, 1892;) and I do hereby declare the following to be a full, clear, and exact description of the invention, such as will enable others skilled in the art to which it appertains to make and use the same.

This invention for improvements in scythes has for its object to connect a scythe blade to its stock in such manner that the said blade can readily be adjusted and fixed at any desired angle to the stock; and consists essentially in connecting a scythe blade to its stock by a ball and socket joint.

Figure 1:
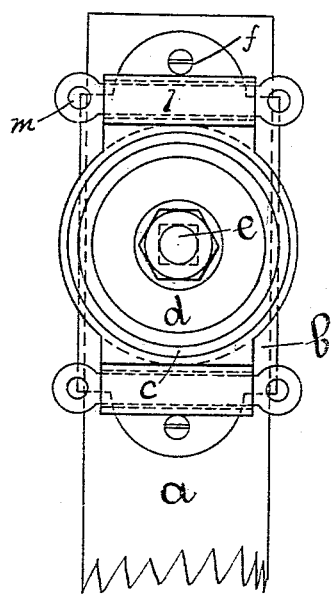
Figure 3:
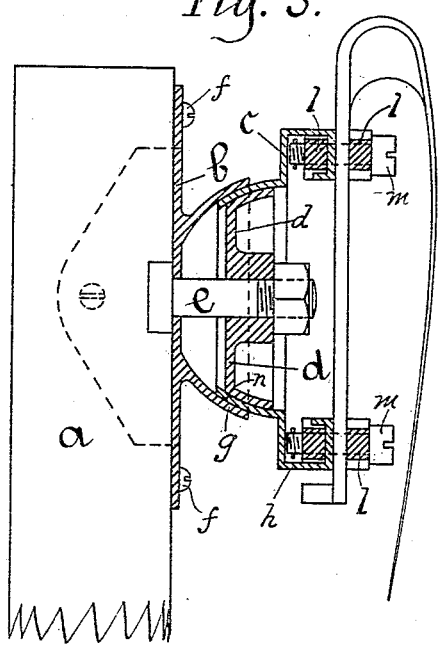
Figure 2:
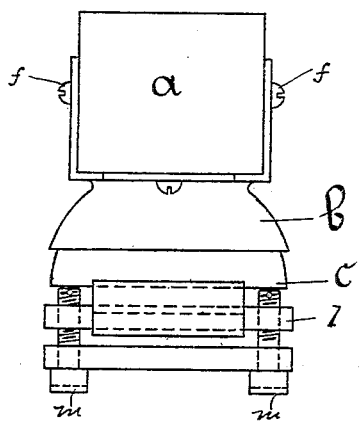

In the accompanying sheet of illustrative drawings:—Figure 1 is a front elevation of a ball and socket joint constructed according to this invention and shown attached to the scythe stock, and Fig. 2 is a plan and Fig. 3 a longitudinal section of the same, the scythe blade being shown fixed in position in Fig. 3.

The base $b$ of the ball and socket joint is adapted to be secured to the stock $a$ by means of the screws $f$ and is formed with a spherical cup or socket $g$. The clamp or holder $h$ to which the scythe blade $i$ is attached by means of the bars $l$ and screws $m$ is formed with an external spherical surface or part ball $c$ adapted to fit the cup or socket $g$ and with a spherical cup or socket $n$. The ball $c$ and socket $g$ are rigidly fixed together by means of an axial bolt $e$ and spherical washer $d$ adapted to fit the socket $n$ and adapted to be forced therein by the bolt $e$ and so firmly clamp the socket $g$ and ball $c$ together. In order to adjust the scythe blade $i$ the nut of the bolt is loosened and the ball $c$ can then be adjusted as desired in the socket $g$ without moving the socket $g$; the washer $d$, or the bolt $e$, and be again clamped in the new position by tightening up the bolt. With this arrangement of ball and socket joint for fixing scythe blades to their stocks, the angle of the scythe blade does not require to be specially formed and all kinds of blades can be fixed to the same stock.

What I claim, and desire to secure by Letters Patent, is—

The device for fixing a scythe blade to its stock consisting of the base $b$ adapted to be fixed on the stock and formed with a socket $g$, of the clamp $h$ adapted to hold the scythe blade and formed with its part hollow ball $c$ fitting in the socket $g$ of the washer $d$ fitting in the hollow ball $c$, and of a nut $e$ adapted to secure the whole together substantially as described.

In testimony whereof I affix my signature in presence of two witnesses.

JOHANN BADERTSCHER.

Witnesses:
C. HÜRST,
C. RIHS.